United States Patent
Handa et al.

(10) Patent No.: US 11,814,155 B2
(45) Date of Patent: Nov. 14, 2023

(54) CONTROL APPARATUS AND CONTROL METHOD FOR SPECULAR OBJECT DETECTION BASED ON AN UNMANNED AERIAL VEHICLE'S REFLECTION

(71) Applicant: SONY GROUP CORPORATION, Tokyo (JP)

(72) Inventors: Masaki Handa, Tokyo (JP); Shinichiro Abe, Tokyo (JP); Masahiko Toyoshi, Tokyo (JP); Takuto Motoyama, Tokyo (JP); Shun Lee, Tokyo (JP); Kenichiro Oi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 228 days.

(21) Appl. No.: 17/297,082

(22) PCT Filed: Nov. 26, 2019

(86) PCT No.: PCT/JP2019/046116
§ 371 (c)(1),
(2) Date: May 26, 2021

(87) PCT Pub. No.: WO2020/116232
PCT Pub. Date: Jun. 11, 2020

(65) Prior Publication Data
US 2022/0024560 A1 Jan. 27, 2022

(30) Foreign Application Priority Data
Dec. 5, 2018 (JP) ................................. 2018-228570

(51) Int. Cl.
*B64C 13/00* (2006.01)
*B64C 39/02* (2023.01)
(Continued)

(52) U.S. Cl.
CPC .............. *B64C 13/00* (2013.01); *B64C 39/02* (2013.01); *B64D 47/08* (2013.01); *G01C 7/02* (2013.01);
(Continued)

(58) Field of Classification Search
CPC ......... B64C 13/00; B64C 39/02; B64D 47/08; G01C 7/02; G05D 1/00; B64U 2201/00; B64U 2101/30
See application file for complete search history.

(56) References Cited

U.S. PATENT DOCUMENTS 10,196,141 B1 *  2/2019  Cui ..................... B64C 39/024
10,281,916 B1 *  5/2019  Cui ..................... G06V 10/60
(Continued)

FOREIGN PATENT DOCUMENTS

CN       205031182 U    2/2016
EP        3009238 A1    4/2016
(Continued)

OTHER PUBLICATIONS

Georgia State University Physics and Astronomy Department, "Thin Lens Equation", Mar. 2018, Georgia State University. http://hyperphysics.phy-astr.gsu.edu/hbase/geoopt/lenseq.html (Year: 2018).*

(Continued)

*Primary Examiner* — Hussein Elchanti
*Assistant Examiner* — Kenneth M Dunne
(74) *Attorney, Agent, or Firm* — CHIP LAW GROUP

(57) ABSTRACT

A control apparatus includes an acquisition unit that acquires captured data in which an object around a moving object is captured by an imaging unit, where the moving object is one of a moving object that is irradiated with spontaneous emission light and a moving object that moves with a predetermined pattern, and a determination unit that deter- (Continued)

mines that the object is an obstacle if the captured data acquired by the acquisition unit includes a specific pattern.

12 Claims, 12 Drawing Sheets

(51) Int. Cl.
 *B64D 47/08* (2006.01)
 *G01C 7/02* (2006.01)
 *G05D 1/00* (2006.01)
 *B64U 101/30* (2023.01)
(52) U.S. Cl.
 CPC ........... *G05D 1/00* (2013.01); *B64U 2101/30* (2023.01); *B64U 2201/00* (2023.01)

(56) References Cited

U.S. PATENT DOCUMENTS

| | | |
|---|---|---|
| 2015/0168954 A1 | 6/2015 | Hickerson et al. |
| 2016/0104044 A1 | 4/2016 | Noh et al. |
| 2017/0308103 A1* | 10/2017 | Li .................... B64D 47/08 |
| 2017/0332872 A1 | 11/2017 | Jun et al. |
| 2019/0281680 A1* | 9/2019 | Thorne ................ G02B 5/3025 |

FOREIGN PATENT DOCUMENTS

| | | | |
|---|---|---|---|
| EP | 3415281 A1 | 12/2018 | |
| JP | 2017-224123 A | 12/2017 | |
| JP | 2019-516483 A | 6/2019 | |
| KR | 10-2015-0065972 A | 6/2015 | |
| KR | 10-2016-0043841 A | 4/2016 | |
| KR | 10-2017-0129571 A | 11/2017 | |
| KR | 101977304 B1 * | 5/2019 | ............. B64D 47/00 |
| WO | 2017/200302 A2 | 11/2017 | |

OTHER PUBLICATIONS

Takeno et al., "Experiments and examination of mirror image cognition using a small robot", 2005, IEEE (Year: 2005).*
International Search Report and Written Opinion of PCT Application No. PCT/JP2019/046116, dated Feb. 18, 2020, 09 pages of ISRWO.

* cited by examiner

FIG.3A
| LIGHT-EMITTING UNIT | CAPTURED DATA |
|---|---|
| 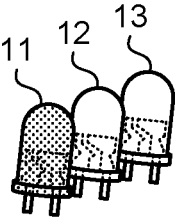 | 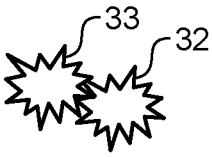 |
FIG.3B
| LIGHT-EMITTING UNIT | CAPTURED DATA |
|---|---|
| 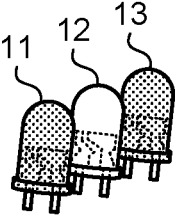 | 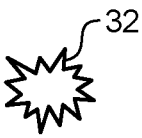 |
FIG.3C
| LIGHT-EMITTING UNIT | CAPTURED DATA |
|---|---|
| 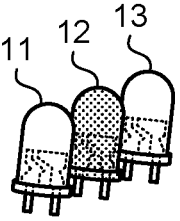 | 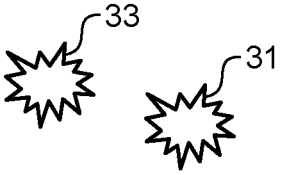 |

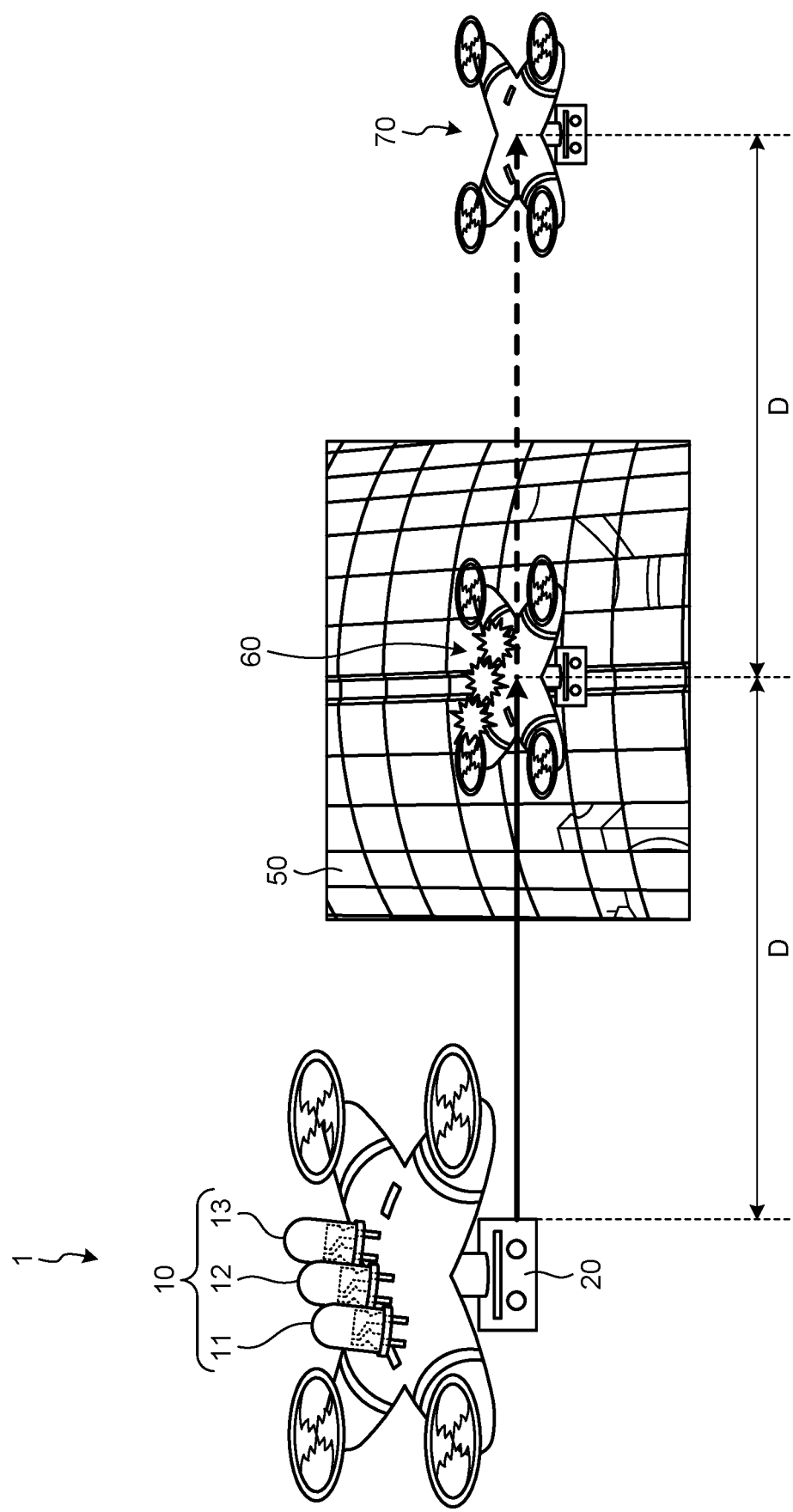

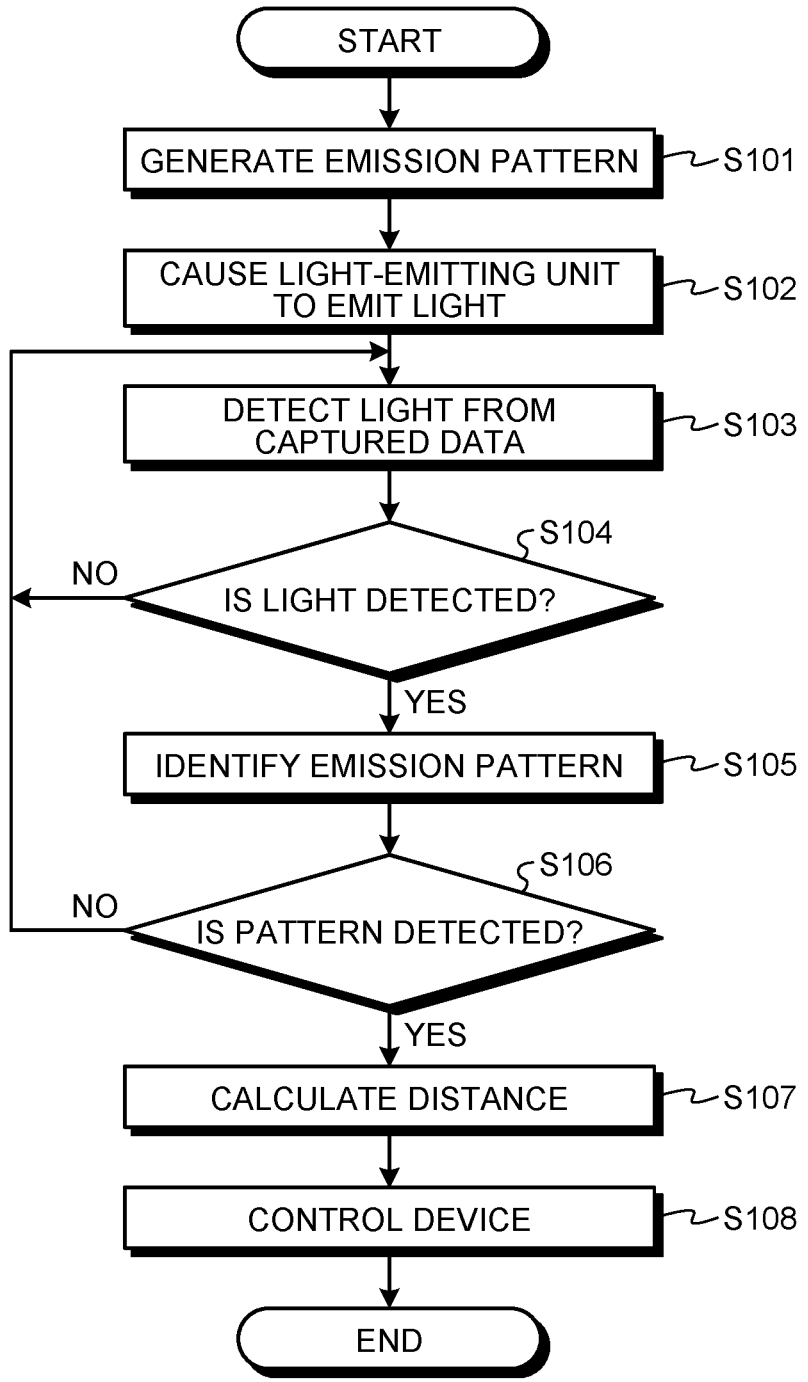

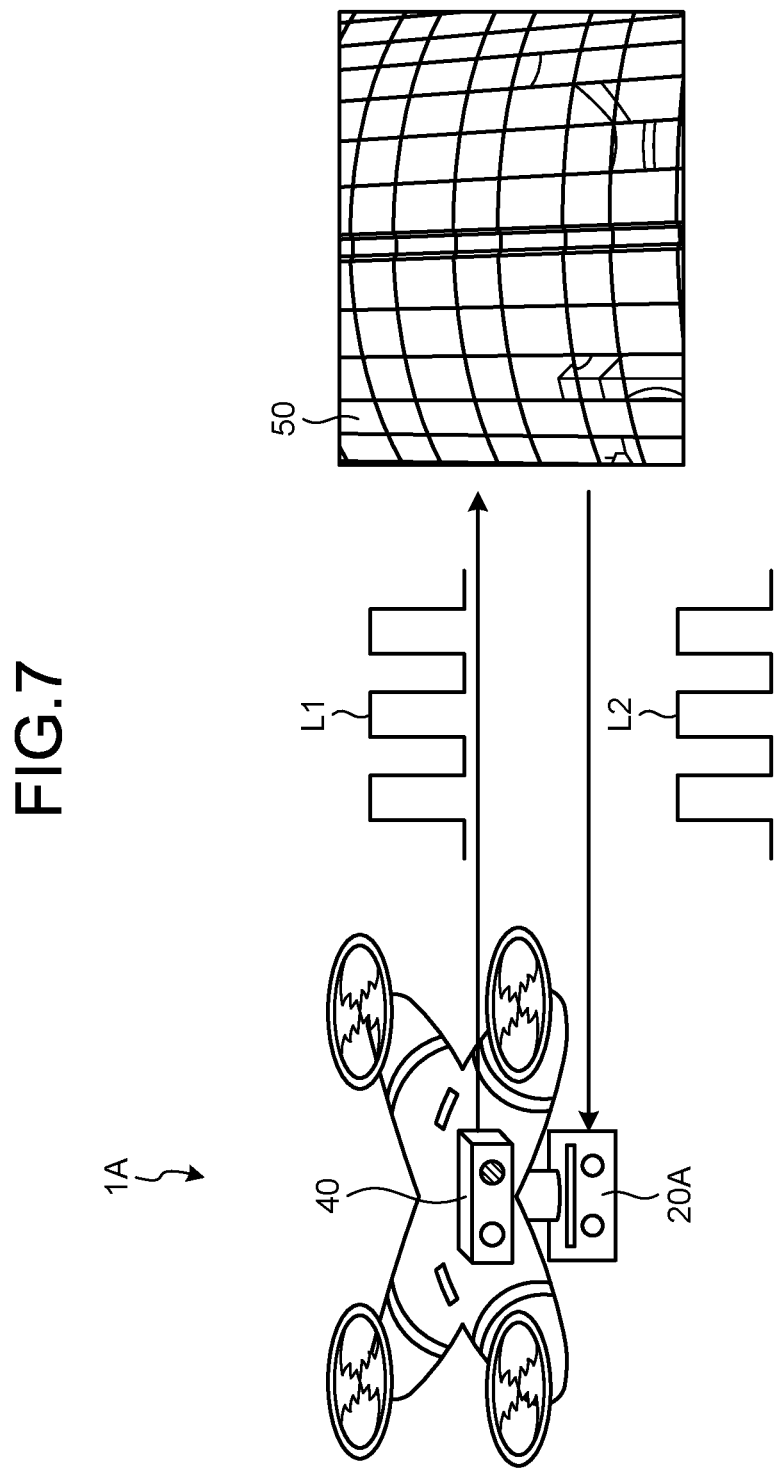

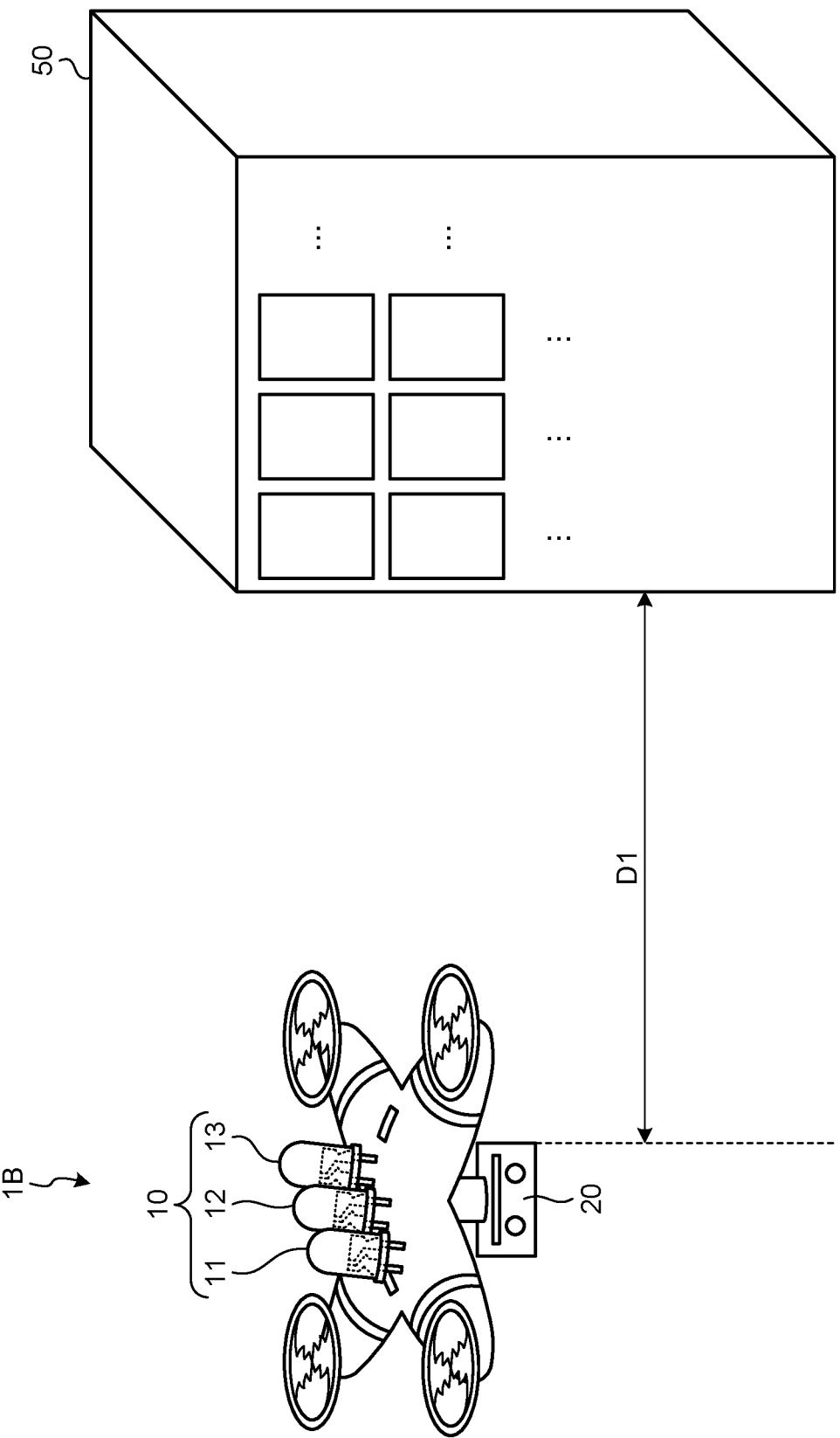

CONTROL APPARATUS AND CONTROL METHOD FOR SPECULAR OBJECT DETECTION BASED ON AN UNMANNED AERIAL VEHICLE'S REFLECTION

CROSS REFERENCE TO RELATED APPLICATIONS

This application is a U.S. National Phase of International Patent Application No. PCT/JP2019/046116 filed on Nov. 26, 2019, which claims priority benefit of Japanese Patent Application No. JP 2018-228570 filed in the Japan Patent Office on Dec. 5, 2018. Each of the above-referenced applications is hereby incorporated herein by reference in its entirety.

FIELD

The present disclosure relates to a control apparatus, a control method, and a program.

BACKGROUND

A technology for controlling an unmanned moving object, such as a drone, is known.

For example, Patent Literature 1 discloses an unmanned flight control system that is able to prevent a reduction in a flight time of an unmanned flying device and guide the unmanned flying device to the vicinity of a target object with high accuracy.

CITATION LIST

Patent Literature

Patent Literature 1: JP 2017-224123 A

SUMMARY

Technical Problem

However, the technology described in Patent Literature 1 controls flight with respect to a target object whose position is recognized. Therefore, in the technology described in Patent Literature 1, in some cases, it is difficult to control flight with respect to a target object whose position is not recognized.

To cope with this, the present disclosure proposes a control apparatus, a control method, and a program capable of determining whether a target object for which a moving object needs to be controlled is present.

Solution to Problem

In order to solve the problem described above, a control apparatus is provided that includes: an acquisition unit that acquires captured data in which an object around a moving object is captured by an imaging unit, the moving object being one of a moving object that is irradiated with spontaneous emission light and a moving object that moves with a predetermined pattern; and a determination unit that determines that the object is an obstacle if the captured data acquired by the acquisition unit includes a specific pattern.

BRIEF DESCRIPTION OF DRAWINGS

FIG. 3A is a schematic diagram for explaining an emission pattern.

FIG. 3B is a schematic diagram for explaining the emission pattern.

FIG. 3C is a schematic diagram for explaining the emission pattern.

FIG. 4 is a schematic diagram for explaining a distance between a moving object and a target object.

FIG. 6 is a flowchart illustrating an example of the flow of operation performed by a control apparatus according to the first embodiment.

FIG. 7 is a schematic diagram for explaining operation performed by a control apparatus according to a second embodiment.

FIG. 9 is a schematic diagram for explaining operation performed by a control apparatus according to a fourth embodiment.

DESCRIPTION OF EMBODIMENTS

Embodiments of the present disclosure will be described in detail below based on the drawings. In each of the embodiments below, the same components are denoted by the same reference symbols, and repeated explanation will be omitted.

Further, the present disclosure will be described in sequence of items listed below.

1. Overview
    1-1. One Example of Moving Object
2. First Embodiment
    2-1. Configuration Example of Unmanned Flying device
    2-2. Operation Example of Control Apparatus
3. Second Embodiment
    3-1. Configuration Example of Unmanned Flying Device
    3-2. Operation Example of Control Apparatus
4. Third Embodiment
    4-1. Operation Example of Control Apparatus 5. Fourth Embodiment
   5-1. Operation Example of Control Apparatus
   5-2. Configuration Example of Unmanned Flying Device
6. Fifth Embodiment
   6-1. Configuration Example of Unmanned Flying Device
7. Hardware Configuration

1. Overview

1-1. One Example of Moving Object

Figure 1:
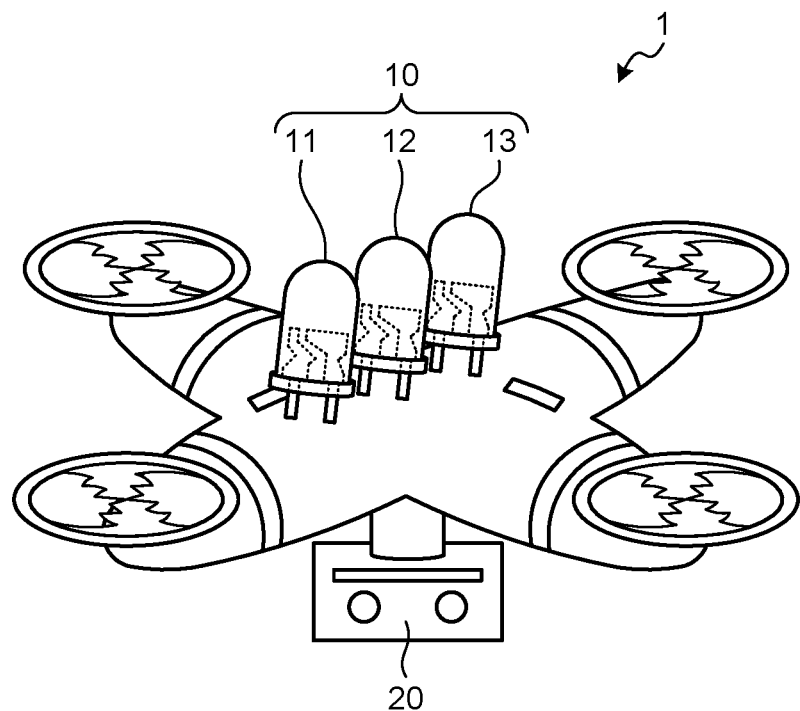
FIG. 1 is a schematic diagram illustrating one example of a moving object according to the present embodiment.

One example of a moving object according to the present embodiment will be described with reference to FIG. 1. FIG. 1 is a schematic diagram illustrating one example of the moving object according to the present embodiment.

As illustrated in FIG. 1, the moving object according to the present embodiment is, for example, an unmanned flying device 1, such as a drone. The unmanned flying device 1 includes, for example, a light-emitting unit 10 including a first light-emitting element 11, a second light-emitting element 12, and a third light-emitting element 13, and an imaging unit 20. In the following, explanation will be given based on the assumption that the moving object according to the present embodiment is the unmanned flying device 1, but this is a mere example, and the present disclosure is not limited to this example. The moving object according to the present disclosure may be an autonomous mobile robot and an automatic driving vehicle used in factories or the like.

2. First Embodiment

2-1. Configuration Example of Unmanned Flying Device

Figure 2:
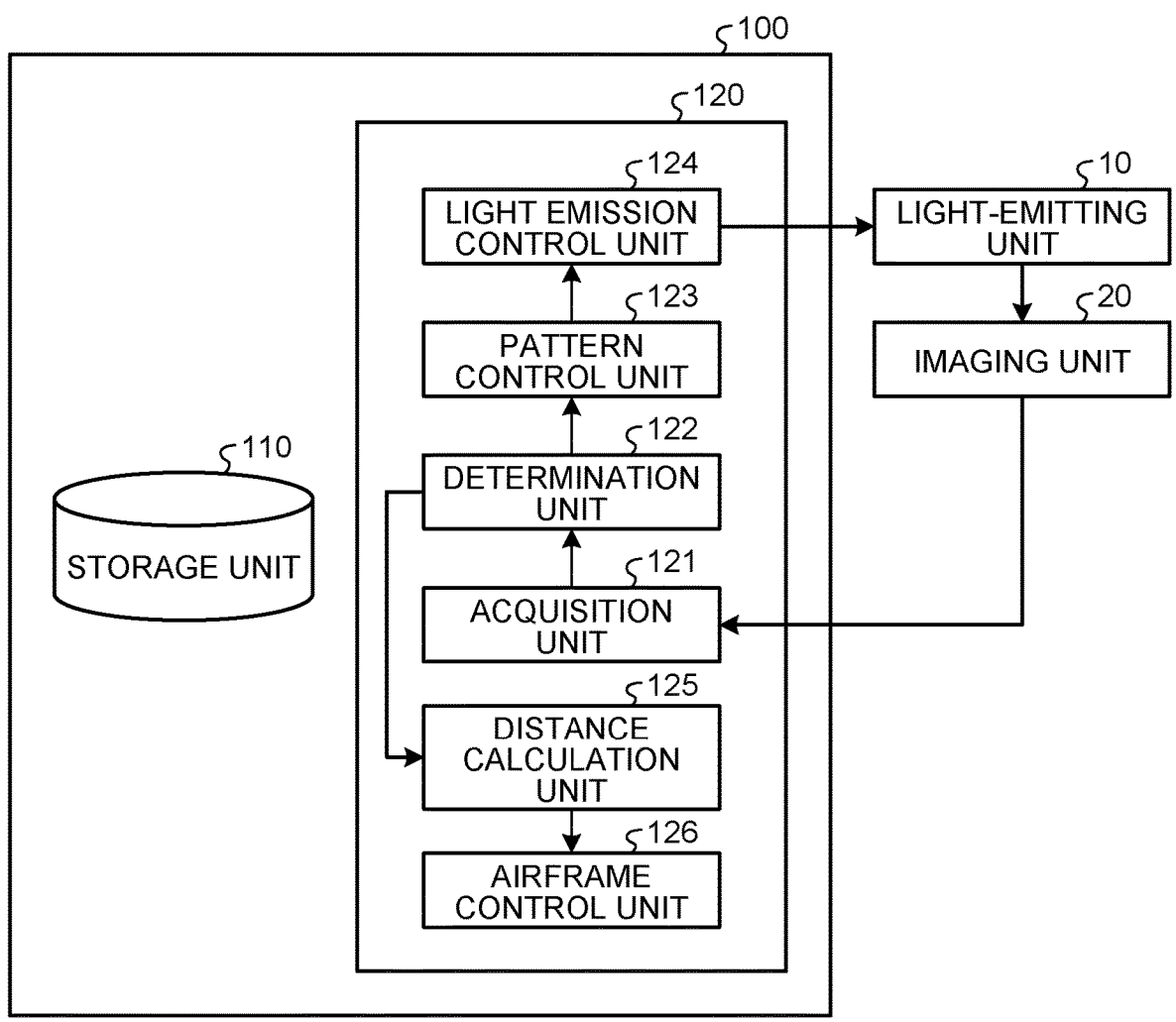
FIG. 2 is a block diagram illustrating one example of a configuration of an unmanned flying device according to a first embodiment.

One example of a configuration of the unmanned flying device 1 according to the present embodiment will be described with reference to FIG. 2. FIG. 2 is a block diagram illustrating one example of the configuration of the unmanned flying device 1.

As illustrated in FIG. 2, the unmanned flying device 1 includes the light-emitting unit 10, the imaging unit 20, and a control apparatus 100.

As illustrated in FIG. 1, the light-emitting unit 10 includes, for example, the first light-emitting element 11, the second light-emitting element 12, and the third light-emitting element 13. The first light-emitting element 11, the second light-emitting element 12, and the third light-emitting element 13 emit light to a target object. The first light-emitting element 11, the second light-emitting element 12, and the third light-emitting element 13 can independently be lighted and blinked. the first light-emitting element 11, the second light-emitting element 12, and the third light-emitting element 13 may be realized by, for example, light emitting diodes (LEDs).

The imaging unit 20 captures images of various objects. The imaging unit 20 captures images of irradiation light that is applied to the target object from the first light-emitting element 11, the second light-emitting element 12, and the third light-emitting element 13, for example. Specifically, the imaging unit 20 captures, for example, images of reflected light that is caused by the irradiation light that is applied to the target object from the first light-emitting element 11, the second light-emitting element 12, and the third light-emitting element 13. The imaging unit 20 outputs captured data that is captured to an acquisition unit 121. The imaging unit 20 may be realized by, for example, a red green blue (RGB) camera or a stereo camera.

The control apparatus 100 determines whether the target object that is irradiated with light by the first light-emitting element 11, the second light-emitting element 12, and the third light-emitting element 13 is an obstacle that the unmanned flying device 1 needs to avoid, for example. Specifically, the control apparatus 100 determines whether the target object is a specular object that reflects light. The control apparatus 100 includes a storage unit 110 and a control unit 120.

The storage unit 110 stores therein various kinds of information. For example, the storage unit 110 stores therein a program for implementing each of the units of the control apparatus 100. In this case, the control unit 120 implements functions of each of the units by loading a program stored in the storage unit 110 and executing the program. The storage unit 110 may be realized by, for example, a semiconductor memory device, such as a random access memory (RAM), a read only memory (ROM), or a flash memory, or a storage device, such as a hard disk, a solid state drive, or an optical disk. The storage unit 110 may be configured with a plurality of different memories or the like.

The control unit 120 implements various functions by executing a program stored in the storage unit 110, for example. The control unit 120 may be realized by an electronic circuit including a central processing unit (CPU), for example. The control unit 120 includes the acquisition unit 121, a determination unit 122, a pattern control unit 123, a light emission control unit 124, a distance calculation unit 125, and an airframe control unit 126.

The acquisition unit 121 acquires, from the imaging unit 20, captured data that is captured by the imaging unit 20. For example, the acquisition unit 121 acquires a pattern of a target object that is included in the captured data. Specifically, the acquisition unit 121 acquires an emission pattern of light or a movement pattern of the unmanned flying device 1 in the captured data. For example, the acquisition unit 121 acquires an emission pattern of reflected light of spontaneous emission light that is applied to the target object. In this case, if an LED is arranged as the light-emitting unit 10 in the unmanned flying device 1, an emission pattern of reflected light of the LED applied to the target object is acquired. Here, the LED may be arranged in advance to recognize a front-back direction of the unmanned flying device 1, or may be arranged to apply light to the target object. A method of detecting the emission pattern of light by the acquisition unit 121 is not specifically limited, but, for example, it may be possible to adopt a method of extracting a pixel at which a luminance value is equal to or larger than a predetermined threshold. The acquisition unit 121 outputs a detection result to the determination unit 122.

The determination unit 122 detects a specific pattern on the basis of an acquisition result of the acquisition unit 121. For example, the determination unit 122 detects, from the emission pattern of light acquired by the acquisition unit 121, light that twinkles at specific intervals generated by the light emission control unit 124. For example, the determination unit 122 detects, from the movement pattern of the unmanned flying device 1 acquired by the acquisition unit 121, a movement pattern that is controlled by the airframe control unit 126. In other words, the specific pattern is the emission pattern of light controlled by the light emission control unit 124 or the movement pattern of the unmanned flying device 1 controlled by the airframe control unit 126.

If the specific emission pattern of light or the specific movement pattern is included, the determination unit 122 determines that the target object captured by the imaging unit 20 is a specular object. The specular object is an object that reflects spontaneous emission light, and is, for example, a glass surface of a building or the like, or a water surface, such as a pond, a lake, a river, or ocean. In general, the imaging unit 20 captures images of surroundings at predetermined intervals while the unmanned flying device 1 is flying, and therefore, the determination unit 122 is able to automatically determine that a specular object is present while the unmanned flying device 1 is flying. If the determination unit 122 determines that the target object is a specular object, the determination unit 122 outputs information including a determination result to the distance calculation unit 125. The specific emission pattern of light and the specific movement pattern will be described later.

The pattern control unit 123 generates, for example, a specific emission pattern of the light-emitting unit 10, and generates a new emission pattern on the basis of the determination result of the determination unit 122. For example, the pattern control unit 123 generates the emission pattern by controlling an emission time, an emission interval, and emission intensity. Here, the emission interval of light generated by the pattern control unit 123 may be an interval that is not recognized by a human as long as the imaging unit 20 is able to recognize the interval. Specifically, if the imaging unit 20 operates at 60 hertz (Hz), it is sufficient for the pattern control unit 123 to control the emission interval such that the imaging unit 20 that operates at 60 Hz can recognize the interval. The pattern control unit 123 outputs control information including the generated emission pattern to the light emission control unit 124.

The light emission control unit 124 controls the light-emitting unit 10 in accordance with the control information received from the pattern control unit 123. Specifically, the light emission control unit 124 causes a specific light-emitting element among the light-emitting elements included in the light-emitting unit 10 to emit light in accordance with the control information.

The emission pattern of the light-emitting unit 10 will be described with reference to FIGS. 3A, 3B, and 3C. FIGS. 3A, 3B, and 3C are schematic diagrams illustrating examples of the emission pattern of the light-emitting unit 10.

As illustrated in FIG. 3A, for example, the light emission control unit 124 causes the second light-emitting element 12 and the third light-emitting element 13 in the light-emitting unit 10 to emit light, to the target object, with a pattern corresponding to the control information. In this case, the determination unit 122 detects, from the captured data acquired by the acquisition unit 121, whether second reflected light 32 corresponding to the second light-emitting element 12 and third reflected light 33 corresponding to the third light-emitting element 13 are included in the captured data in which the target object is captured. Then, if the second reflected light 32 and the third reflected light 33 are emitted with the pattern corresponding to the control information, the determination unit 122 determines that the target object is a specular object.

As illustrated in FIG. 3B, for example, the light emission control unit 124 causes only the second light-emitting element 12 in the light-emitting unit 10 to emit light, to the target object, with a pattern corresponding to the control information. In this case, the determination unit 122 detects, from the captured data acquired by the acquisition unit 121, whether the second reflected light 32 corresponding to the second light-emitting element 12 is included in the captured data in which the target object is captured. Then, if the second reflected light 32 is emitted with the pattern corresponding to the control information, the determination unit 122 determines that the target object is a specular object.

As illustrated in FIG. 3C, for example, the light emission control unit 124 causes the first light-emitting element 11 and the third light-emitting element 13 in the light-emitting unit 10 to emit light, to the target object, with a pattern corresponding to the control information. In this case, the determination unit 122 detects, from the captured data acquired by the acquisition unit 121, whether first reflected light 31 corresponding to the first light-emitting element 11 and the third reflected light 33 corresponding to the third light-emitting element 13 are included in the captured data in which the target object is captured. Then, if the first reflected light 31 and the third reflected light 33 are emitted with the pattern corresponding to the control information, the determination unit 122 determines that the target object is a specular object.

As illustrated in FIGS. 3A, 3B, and 3C, the light emission control unit 124 causes at least one of the first light-emitting element 11 to the third light-emitting element 13 to emit light with a predetermined emission pattern, so that the determination unit 122 is able to determine whether the target object irradiated with the light is a specular object. While not clearly illustrated in FIGS. 3A, 3B, and 3C, the light emission control unit 124 may cause the first light-emitting element 11 to the third light-emitting element 13 to emit light with different colors, at different emission intervals, or at different intensity. Further, the light emission control unit 124 may cause the first light-emitting element 11 to the third light-emitting element 13 to emit light by taking into account brightness of surroundings or light emission of an illumination apparatus arranged on a surrounding building. For example, the light emission control unit 124 may increase the emission intensity of the first light-emitting element 11 to the third light-emitting element 13 with an increase in the brightness of the surroundings, and decrease the emission intensity of the first light-emitting element 11 to the third light-emitting element 13 with a decrease in the brightness of the surroundings. For example, if an illumination apparatus is arranged on a surrounding building or the like, the light emission control unit 124 may control the first light-emitting element 11 to the third light-emitting element 13 so as to prevent interference with light emitted by the illumination apparatus.

The distance calculation unit 125 calculates a distance between the unmanned flying device 1 and the target object. For example, when receiving, from the determination unit 122, the information indicating that the target object is a specular object, the distance calculation unit 125 calculates a distance between the unmanned flying device 1 and the specular object. In other words, the distance calculation unit 125 calculates a distance between the unmanned flying device 1 and an obstacle that needs to be avoided by the unmanned flying device 1. For example, if the imaging unit 20 is a stereo camera, the distance calculation unit 125 calculates the distance between the unmanned flying device 1 and the specular object based on the principle of triangulation using the stereo camera. The distance calculation unit 125 outputs distance information including the calculated distance between the unmanned flying device 1 and the specular object to the airframe control unit 126.

A method of calculating the distance between the moving object and the target object will be described in detail with reference to FIG. 4. FIG. 4 is a schematic diagram for explaining the method of calculating the distance between the unmanned flying device 1 and the specular object.

Meanwhile, in FIG. 4, explanation will be given based on the assumption that the specular object is a glass surface 50 of a building or the like, but this is a mere example, and the specular object is not limited to the glass surface 50.

As illustrated in FIG. 4, the unmanned flying device 1 appears in the glass surface 50 and a reflection image 60 is formed. In this case, a space between the unmanned flying device 1 and the glass surface 50 also appears in the glass surface 50. Therefore, if the distance calculation unit 125 calculates the distance between the unmanned flying device 1 and the glass surface 50 on the basis of the reflection image 60, the distance calculation unit 125 calculates a distance between the unmanned flying device 1 and a virtual image 70 in which a distance to the glass surface 50 is added. In other words, the distance calculation unit 125 calculates a doubled distance between the unmanned flying device 1 and the glass surface 50. Specifically, if the distance between the unmanned flying device 1 and the glass surface 50 is denoted by D, it is calculated that the virtual image 70 is located at a position of 2D in which D from the glass surface 50 is further added. Therefore, the distance calculation unit 125 is able to calculate the distance between the unmanned flying device 1 and the glass surface 50 by reducing the calculated distance to half.

FIG. 2 is referred to again. The airframe control unit 126 controls the unmanned flying device 1 on the basis of the distance information received from the distance calculation unit 125. For example, if the distance between the unmanned flying device 1 and the specular object is small, the airframe control unit 126 may stop the unmanned flying device 1 or cause the unmanned flying device 1 to avoid the specular object. In other words, if an obstacle that needs to be avoided is present around the unmanned flying device 1, the airframe control unit 126 causes the unmanned flying device 1 to avoid the obstacle.

The airframe control unit 126 causes the unmanned flying device 1 to fly with a specific movement pattern in order to determine whether the target object is a specular object, for example.

Figure 5A:
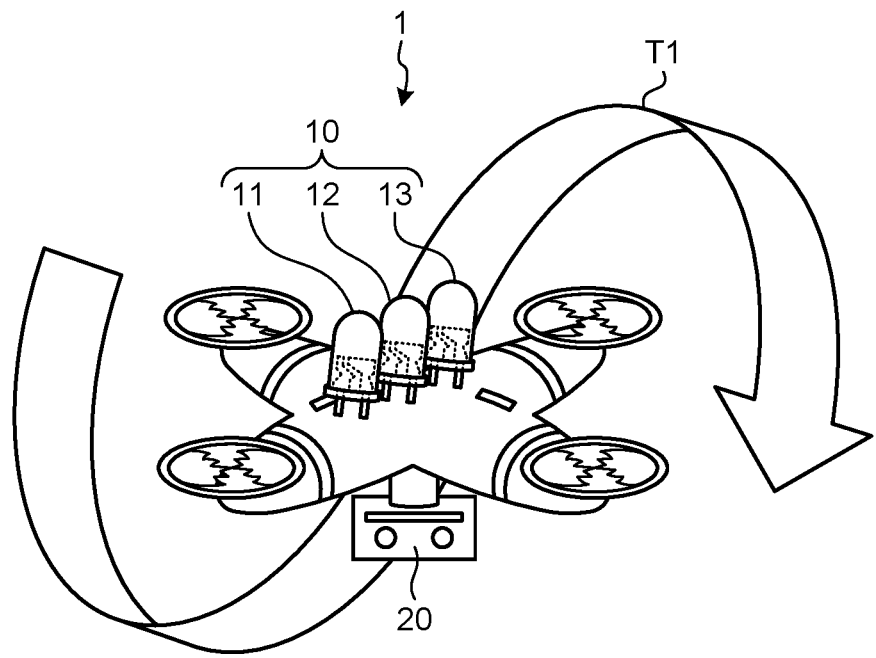
FIG. 5A is a schematic diagram for explaining a movement pattern of the moving object.
Figure 5B:
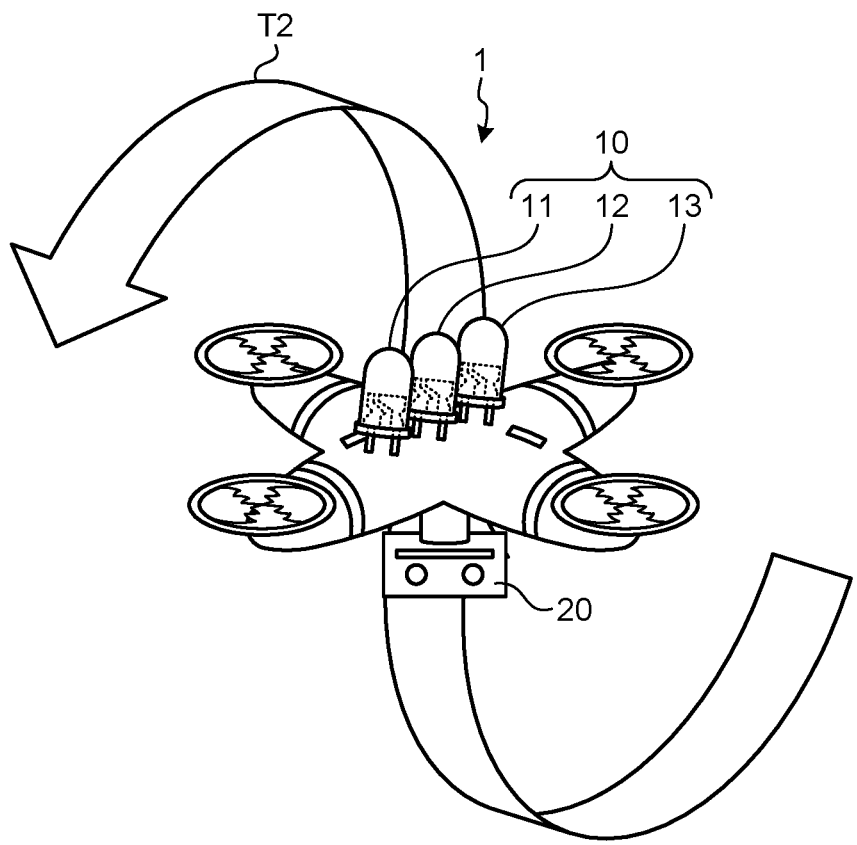
FIG. 5B is a schematic diagram for explaining the movement pattern of the moving object.

The specific movement pattern of the unmanned flying device 1 will be described with reference to FIGS. 5A and 5B. FIGS. 5A and 5B are schematic diagrams illustrating examples of the specific movement pattern of the unmanned flying device 1.

As illustrated in FIG. 5A, for example, the airframe control unit 126 causes the unmanned flying device 1 to move in the rightward direction in the figure of eight as indicated by a trajectory T1. In this case, the determination unit 122 detects whether the unmanned flying device 1 makes a circle in the captured data in which the target object is captured and which is acquired by the acquisition unit 121. Then, if the unmanned flying device 1 makes a circle in the rightward direction in the figure of eight as indicated by the trajectory T1, the determination unit 122 determines that the target object is a specular object.

As illustrated in FIG. 5B, for example, the airframe control unit 126 causes the unmanned flying device 1 to move in a leftward direction in the figure of eight as indicated by a trajectory T2. In this case, the determination unit 122 detects whether the unmanned flying device 1 makes a circle in the captured data in which the target object is captured and which is acquired by the acquisition unit 121. Then, if the unmanned flying device 1 makes a circle in the leftward direction in the figure of eight as indicated by the trajectory T2, the determination unit 122 determines that the target object is a specular object.

As illustrated in FIGS. 5A and 5B, the airframe control unit 126 causes the unmanned flying device 1 to make a circle with the specific movement pattern, and therefore, the determination unit 122 is able to determine whether the target object is a specular object. In FIGS. 5A and 5B, the cases are described in which the unmanned flying device 1 is caused to make a circle in the figure of eight as indicated by the trajectory T1 and the trajectory T2, but this is a mere example, and the present disclosure is not limited to this example. The airframe control unit 126 may cause the unmanned flying device 1 to reciprocate in a specific direction, cause the unmanned flying device 1 to fly in a circular orbit, or cause the unmanned flying device 1 to repeat flying and stopping, as the specific movement pattern.

2-2. Operation Example of Control Apparatus

A process performed by the control unit 120 of the control apparatus 100 will be described with reference to FIG. 6. FIG. 6 is a flowchart illustrating an example of the flow of the process performed by the control unit 120.

First, the control unit 120 generates an emission pattern of light emitted by the light-emitting unit 10 (Step S101). Specifically, the control unit 120 causes the pattern control unit 123 to generate the emission pattern of light. Then, the control unit 120 proceeds to Step S102.

Subsequently, the control unit 120 causes the light-emitting unit 10 to emit light in accordance with the emission pattern generated at Step S101 (Step S102). Specifically, the control unit 120 causes the light emission control unit 124 to cause the light-emitting unit 10 to emit light. Then, the control unit 120 proceeds to Step S103.

Subsequently, the control unit 120 detects whether captured data of a target object captured by the imaging unit 20 includes light (Step S103). Specifically, the control unit 120 causes the determination unit 122 to detect light included in the captured data acquired by the acquisition unit 121. Then, the control unit 120 proceeds to Step S104.

If light is not detected from the captured data ("No" at Step S104), the control unit 120 returns to Step S103, and detects light from new captured data. In contrast, if light is detected from the captured data ("Yes" at Step S104), the control unit 120 proceeds to Step S105.

Subsequently, the control unit 120 identifies the emission pattern of the detected light (Step S105). Specifically, the control unit 120 causes the determination unit 122 to identify whether the emission pattern of the detected light is the emission pattern of light generated at Step S101. Then, the control unit 120 proceeds to Step S106.

If the emission patter of light generated at Step S101 is not detected ("No" at Step S106), the control unit 120 returns to Step S103, and detect light from new captured data. In contrast, if the emission pattern of light generated at Step S101 is detected ("Yes" at Step S106), the control unit 120 determines that the target object is a specular object, and proceeds to Step S107.

Subsequently, the control unit 120 calculates a distance between the unmanned flying device 1 and the specular object (Step S107). Specifically, the control unit 120 causes the distance calculation unit 125 to calculate the distance between the unmanned flying device 1 and the specular object. Then, the control unit 120 proceeds to Step S108.

Then, the control unit 120 controls the unmanned flying device 1 on the basis of the distance between the unmanned flying device 1 and the specular object (Step S108). Specifically, the control unit 120 causes the airframe control unit 126 to control the unmanned flying device 1. Then, the control unit 120 terminates the process in FIG. 6.

As described above, in the first embodiment of the present disclosure, it is possible to detect a specular object on the basis of the captured data. Further, it is possible to calculate a distance to the specular object, and control the moving object to prevent crash with the specular object. Consequently, in the first embodiment, it is possible to appropriately control the moving object.

3. Second Embodiment

3-1. Configuration Example of Unmanned Flying Device

A configuration of an unmanned flying device according to a second embodiment will be described with reference to FIG. 7. FIG. 7 is a schematic diagram illustrating one example of the configuration of the unmanned flying device of the second embodiment.

As illustrated in FIG. 7, an unmanned flying device 1A includes an imaging unit 20A, a time of flight (ToF) sensor 40, and the control apparatus 100 as illustrated in FIG. 2.

The ToF sensor 40 emits irradiation light L1, such as pulsed light, to the glass surface 50. In other words, the ToF sensor 40 functions as a light-emitting unit. In this case, the ToF sensor 40 emits the irradiation light L1 with a specific irradiation pattern to the glass surface.

The imaging unit 20A receives reflected light L2 that is reflection of the irradiation light L1 by the glass surface 50. The imaging unit 20A may be realized by, for example, an infrared (IR) stereo camera.

3-2. Operation Example of Control Apparatus

In the second embodiment, in the control apparatus 100, for example, the ToF sensor 40 emits the irradiation light L1 with a specific irradiation pattern to the target object. In this case, if the imaging unit 20A receives the reflected light L2 corresponding to the irradiation pattern of the irradiation light L1, the control apparatus 100 determines that the target object is a specular object (the glass surface 50). After the specular object is detected, the unmanned flying device 1A is controlled in the same manner as in the first embodiment.

As described above, in the second embodiment, whether the target object is a specular object is determined by using the ToF sensor as the light-emitting unit. Further, in the second embodiment, it is possible to control the unmanned flying device so as not to crash with the specular object that is detected using the ToF sensor.

4. Third Embodiment

4-1. Operation Example of Control Apparatus

Figure 8A:
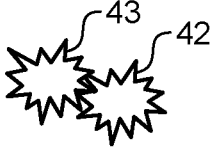
FIG. 8A is a schematic diagram for explaining operation performed by a control apparatus according to a third embodiment.

Operation of a control apparatus according to a third embodiment will be described with reference to FIG. 8A and FIG. 8B. FIG. 8A to FIGS., 8B, and 8C are schematic diagrams for explaining one example of the operation performed by the control apparatus according to the third embodiment. Meanwhile, an unmanned flying device according to the third embodiment has the same configuration as the unmanned flying device according to the first embodiment illustrated in FIG. 1.

In the third embodiment, when the determination unit 122 detects a specific emission pattern from the captured data acquired by the acquisition unit 121 at a timing at which the light-emitting unit 10 does not emit light, the light-emitting unit 10 is caused to emit light with an emission pattern that is different from the detected emission pattern. In other words, in the third embodiment, the light-emitting unit 10 is controlled such that the detected emission pattern and the emission pattern of the light-emitting unit 10 do not interfere with each other.

As illustrated in FIG. 8A, for example, it is assumed that second reflected light 42 corresponding to the second light-emitting element 12 and third reflected light 43 corresponding to the third light-emitting element 13 are detected from the captured data that is captured by the imaging unit 20. In this case, the pattern control unit 123 generates control information for causing only the first light-emitting element 11 to emit light. Then, the light emission control unit 124 causes only the first light-emitting element 11 to emit light in accordance with the control information. Accordingly, the light emission control unit 124 is able to control the light-emitting unit 10 so as to prevent interference with the emission pattern of light that is detected when the light-emitting unit 10 does not emit light. Meanwhile, the pattern control unit 123 may generate control information for causing only the second light-emitting element 12 to emit light, or control information for causing only the third light-emitting element 13 to emit light. Furthermore, the pattern control unit 123 may generate control information for causing the first light-emitting element 11 and the second light-emitting element 12 to emit light, or control information for causing the first light-emitting element 11 and the third light-emitting element 13 to emit light. In other words, the control information generated by the pattern control unit 123 is not specifically limited as long as the emission pattern is different from the emission pattern of the detected light.

Figure 8B:
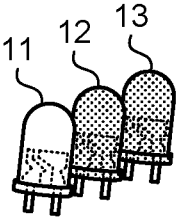
FIG. 8B is a schematic diagram for explaining operation performed by the control apparatus according to the third embodiment.

As illustrated in FIG. 8B, for example, it is assumed that the second reflected light 42 corresponding to the second light-emitting element 12 is detected from the captured data captured by the imaging unit 20. In this case, the pattern control unit 123 generates control information for causing the first light-emitting element 11 and the third light-emitting element 13 to emit light. Then, the light emission control unit 124 causes the first light-emitting element 11 and the third light-emitting element 13 to emit light in accordance with the control information. With this configuration, the light emission control unit 124 is able to control the light-emitting unit 10 so as to prevent interference with the emission pattern of light that is detected when the light-emitting unit 10 does not emit light. Meanwhile, the pattern control unit 123 may generate control information for causing the first light-emitting element 11 to the third light-emitting element 13 to emit light with a different emission pattern that does not interfere with the emission pattern of the detected light.

Figure 8C:
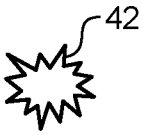
FIG. 8C is a schematic diagram for explaining operation performed by the control apparatus according to the third embodiment.

As illustrated in FIG. 8C, for example, it is assumed that first reflected light 41 corresponding to the first light-emitting element 11 is detected from the captured data that is captured by the imaging unit 20. In this case, the pattern control unit 123 generates control information for causing the second light-emitting element 12 and the third light-emitting element 13 to emit light. Then, the light emission control unit 124 causes the second light-emitting element 12 and the third light-emitting element 13 to emit light in accordance with the control information. With this configuration, the light emission control unit 124 is able to control the light-emitting unit 10 so as to prevent interference with the emission pattern of light that is detected when the light-emitting unit 10 does not emit light. Meanwhile, the pattern control unit 123 may generate control information for causing the first light-emitting element 11 to the third light-emitting element 13 to emit light with a different emission pattern that does not interfere with the emission pattern of the detected light.

In FIGS. 8A, 8B, and 8C, the cases are described in which the light-emitting unit that emits light is controlled to prevent interference with the emission pattern of light that is detected from the captured data when the light-emitting unit 10 does not emit light, but this is a mere example, and the present disclosure is not limited to this example. For example, the pattern control unit 123 may generate control information for emitting light with an emission color that is different from an emission color of light that is detected from the captured data.

5. Fourth Embodiment

5-1. Operation Example of Control Apparatus

Operation performed by a control apparatus according to a fourth embodiment will be described with reference to FIG. 9. FIG. 9 is a schematic diagram for explaining operation performed by the control apparatus according to the fourth embodiment.

In an unmanned flying device 1B, in general, the light-emitting unit 10 continuously emits light to detect a specular object. In this case, the light-emitting unit 10 emits light even in a situation in which the the light-emitting unit 10 need not emit light, so that power consumption increases. To cope with this, it may be possible to cause the light-emitting unit 10 to emit light by using a predetermined condition as a trigger. For example, a condition that a position of the unmanned flying device 1B is changed but a distance D1 between the unmanned flying device 1B and the glass surface 50 that is a surface of a building or the like is constant may be used as the trigger.

5-2. Configuration Example of Unmanned Flying Device

Figure 10:
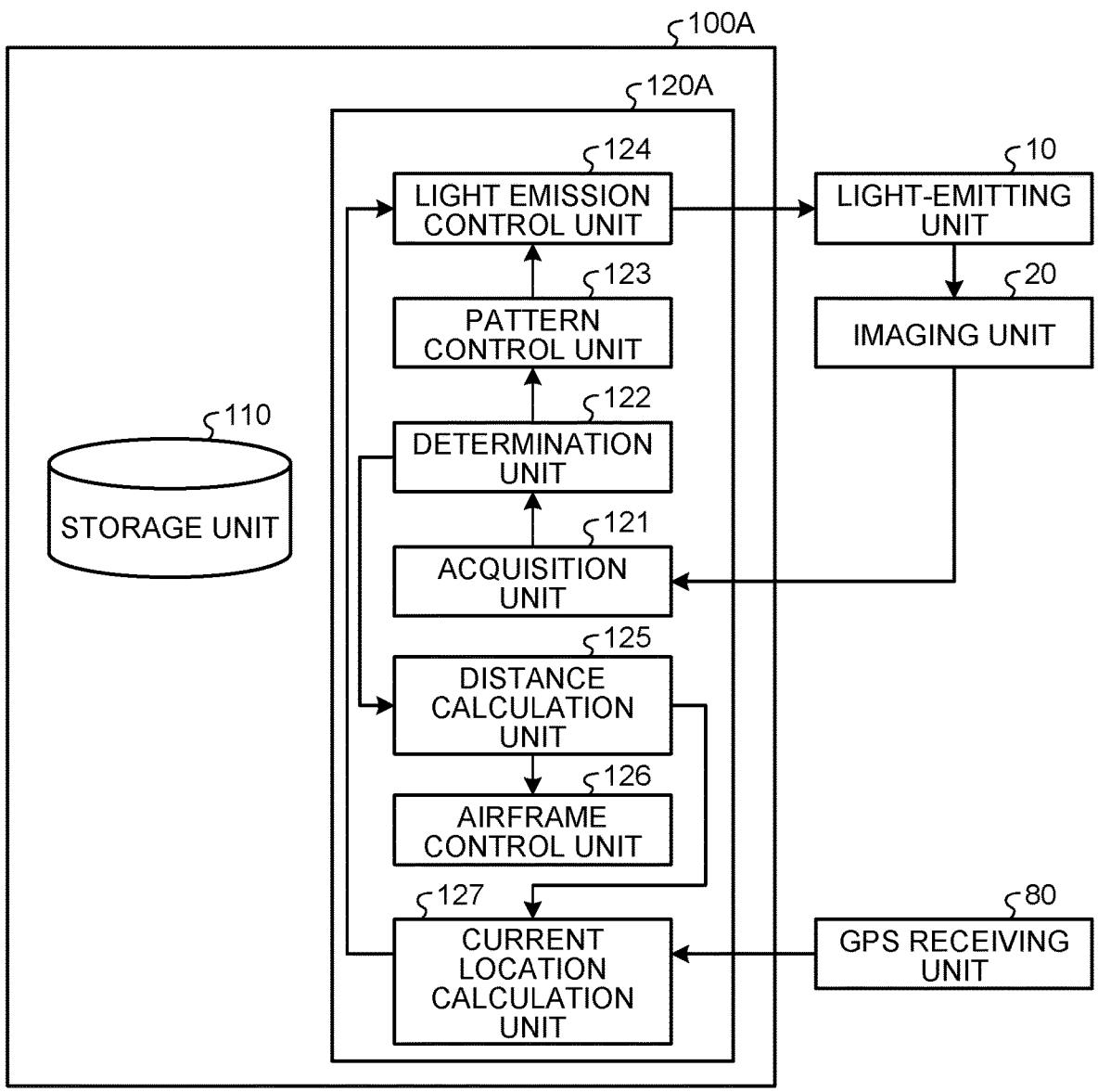
FIG. 10 is a block diagram illustrating an example of a configuration of an unmanned flying device according to the fourth embodiment.

A configuration of the unmanned flying device 1B according to the fourth embodiment will be described with reference to FIG. 10. FIG. 10 is a block diagram illustrating the configuration of the unmanned flying device 1B.

As illustrated in FIG. 10, the unmanned flying device 1B includes the light-emitting unit 10, the imaging unit 20, a global positioning system (GPS) receiving unit 80, and a control apparatus 100A. The control apparatus 100A includes the storage unit 110 and a control unit 120A. The control unit 120A includes the acquisition unit 121, the determination unit 122, the pattern control unit 123, the light emission control unit 124, the distance calculation unit 125, the airframe control unit 126, and a current location calculation unit 127. In other words, the unmanned flying device 1B is different from the unmanned flying device 1 in that it includes the GPS receiving unit 80 and the current location calculation unit 127.

The GPS receiving unit 80 includes a GPS receiving circuit, a GPS receiving antenna, and the like, and receives a GPS signal. The GPS receiving unit 80 outputs the received GPS signal to the current location calculation unit 127.

The current location calculation unit 127 acquires the GPS signal from the GPS receiving unit 80. The current location calculation unit 127 calculates a current location of the unmanned flying device 1B on the basis of the GPS signal, for example. The current location calculation unit 129 outputs the calculated current location to the light emission control unit 124, for example.

The current location calculation unit 127 receives, from the distance calculation unit 125, input of distance information on a distance between the unmanned flying device 1B and the glass surface 50 on a surface of a building or the like. Then, the current location calculation unit 127 outputs control information to the light emission control unit 124 when the current location of the unmanned flying device 1B is changed and the distance D1 between the unmanned flying device 1B the glass surface 50 on the surface of the building or the like is not changed. In this case, the light emission control unit 124 causes the light-emitting unit 10 to emit light only when receiving the control information from the current location calculation unit 127. With this configuration, it is possible to prevent power consumption.

6. Fifth Embodiment

6-1. Configuration Example of Unmanned Flying Device

Figure 11:
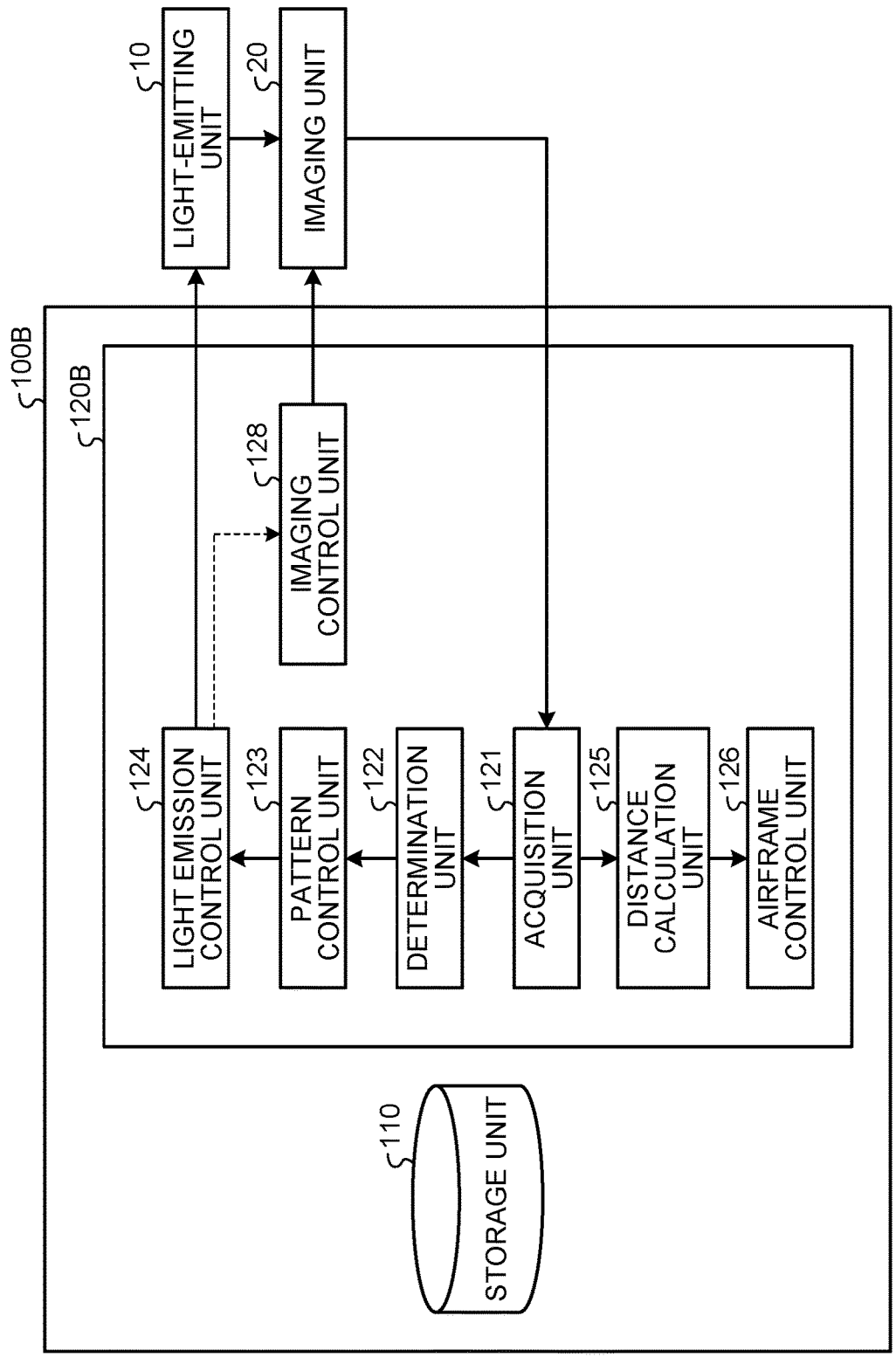
FIG. 11 is a block diagram illustrating an example of a configuration of an unmanned flying device according to a fifth embodiment.

A configuration of an unmanned flying device 1C according to a fifth embodiment will be described with reference to FIG. 11. FIG. 11 is a block diagram illustrating an example of the configuration of the unmanned flying device 1C according to the fifth embodiment.

The unmanned flying device 1C includes the light-emitting unit 10, the imaging unit 20, and a control apparatus 100B. The control apparatus 100B includes the storage unit 110 and a control unit 120B. The control unit 120B includes the acquisition unit 121, the determination unit 122, the pattern control unit 123, the light emission control unit 124, the distance calculation unit 125, the airframe control unit 126, and an imaging control unit 128. In other words, the unmanned flying device 1C is different from the unmanned flying device 1 in that it includes the imaging control unit 128.

The imaging control unit 128 controls a timing at which the imaging unit 20 captures an image of a target object. Specifically, the imaging control unit 128 controls the imaging unit 20 such that a timing at which the imaging unit 20 captures the image of the target object and a timing at which the light emission control unit 124 causes the light-emitting unit 10 to emit light are synchronized with each other. In this case, for example, the imaging control unit 128 receives input of a synchronous signal from the light emission control unit 124. With this configuration, by following the synchronous signal, the imaging control unit 128 is able to control the imaging unit 20 in synchronization with the timing at which the light emission control unit 124 causes the light-emitting unit 10 to emit light. Meanwhile, the synchronous signal may be input from a clock unit (not illustrated) that is arranged on the outside to the light emission control unit 124 and the imaging control unit 128.

As described above, in the fifth embodiment, it is possible to operate the imaging unit 20 at a timing at which the light-emitting unit 10 emits light. Therefore, in the fifth embodiment, it is possible to prevent the determination unit 122 from determining light that is emitted by an emission source different from the light-emitting unit 10 as light that is emitted by the light-emitting unit 10.

Meanwhile, in each of the embodiments as described above, the control apparatus included in the unmanned flying device performs determination on presence of a specular object around the unmanned flying device and a calculation of a distance between the unmanned flying device and the specular object, but this is a mere example, and the present disclosure is not limited to this example. In the present disclosure, for example, the unmanned flying device may perform only a process of detecting light with respect to a target object, and may transmit a detection result to an external information processing server via a radio communication network. In this case, it is sufficient that the information processing server determines presence of a specular object and calculates a distance between the unmanned flying device and the specular object. Further, if it is determined that a specular object is present around the unmanned flying device, the information processing server may cause the unmanned flying device to fly while avoiding the specular object.

7. Hardware Configuration

Figure 12:
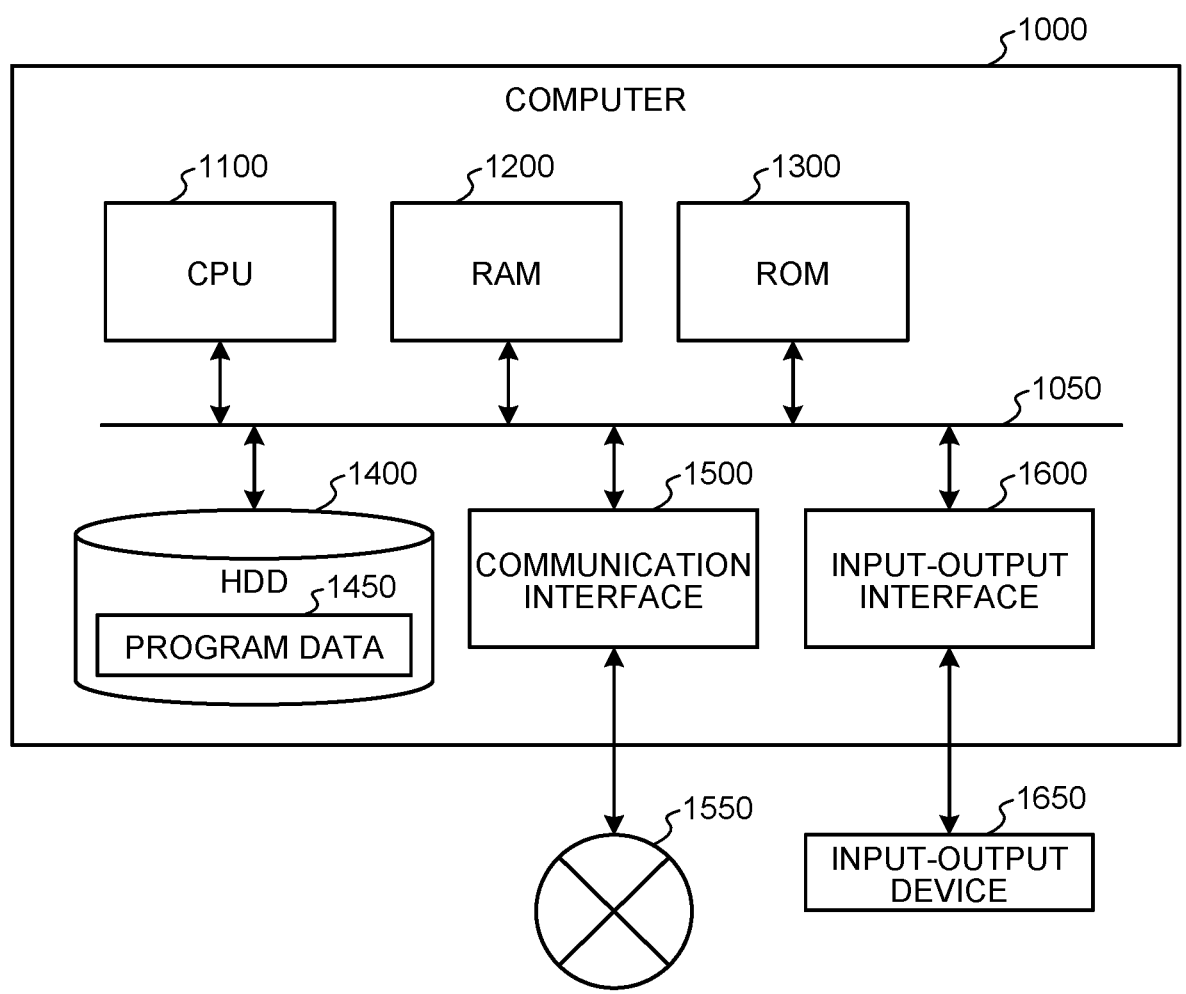
FIG. 12 is a hardware configuration diagram illustrating one example of a computer that implements functions of the control apparatus.

The control apparatus 100 according to each of the embodiments as described above is realized by a computer 1000 as illustrated in FIG. 12, for example. FIG. 12 is a hardware configuration diagram illustrating an example of the computer 1000 that implements the functions of the control apparatus 100. The computer 1000 includes a CPU 1100, a RAM 1200, a read only memory (ROM) 1300, a hard disk drive (HDD) 1400, a communication interface 1500, and an input-output interface 1600. All of the units of the computer 1000 are connected to one another via a bus 1050.

The CPU 1100 operates on the basis of a program that is stored in the ROM 1300 or the HDD 1400, and controls each of the units. For example, the CPU 1100 loads programs stored in the ROM 1300 or the HDD 1400 onto the RAM 1200, and performs processes corresponding to various programs.

The ROM 1300 stores therein a boot program, such as basic input output system (BIOS), that is executed by the CPU 1100 at the time of activation of the computer 1000, a program that is dependent on the hardware of the computer 1000, and the like.

The HDD 1400 is a computer-readable recording medium that non-transitory records therein programs executed by the CPU 1100, data used by the programs, and the like. Specifically, the HDD 1400 is a recording medium that records therein a program according to the present disclosure as one example of program data 1450.

The communication interface 1500 is an interface for connecting the computer 1000 to an external network 1550 (for example, the Internet). For example, the CPU 1100 receives data from other devices and transmits data generated by the CPU 1100 to the other devices via the communication interface 1500.

The input-output interface 1600 is an interface for connecting an input-output device 1650 and the computer 1000. For example, the CPU 1100 receives data from an input device, such as a keyboard or a mouse, via the input-output interface 1600. Further, the CPU 1100 transmits data to an output device, such as a display, a speaker, or a printer, via the input-output interface 1600. Furthermore, the input-output interface 1600 may function as a media interface that reads a program or the like recorded in a predetermined recording medium (medium). Examples of the medium include an optical recording medium, such as a digital versatile disk (DVD) and a phase change rewritable disk (PD), a magneto optical recording medium, such as a magneto optical (MO) disk, a tape medium, a magnetic recording medium, and a semiconductor memory.

For example, if the computer 1000 functions as the control apparatus 100 according to the first embodiment, the CPU 1100 of the computer 1000 executes a program loaded on the RAM 1200, and implements the functions of each of the units. Further, the HDD 1400 stores therein the program according to the present disclosure. Meanwhile, the CPU 1100 reads the program data 1450 from the HDD 1400 and executes the program data 1450, but, as another example, it may be possible to acquire the programs from a different device via the external network 1550.

The effects described in this specification are merely illustrative or exemplified effects, and are not limitative, and, other effects may be achieved.

Additionally, the present technology may also be configured as below.

(1)

A control apparatus comprising:
an acquisition unit that acquires captured data in which an object around a moving object is captured by an imaging unit, the moving object being one of a moving object that is irradiated with spontaneous emission light and a moving object that moves with a predetermined pattern; and
a determination unit that determines that the object is an obstacle if the captured data acquired by the acquisition unit includes a specific pattern.

(2)

The control apparatus according (1), wherein the determination unit detects, as the specific pattern, an emission pattern of reflected light that is reflection of the spontaneous emission light by the object.

(3)

The control apparatus according (1) or (2), wherein the determination unit detects an emission pattern of a light-emitting unit that is arranged on the moving object.

(4)

The control apparatus according to any one of (1) to (3), wherein the determination unit detects, as the specific pattern, a movement pattern of the moving object that is reflected in the object.

(5)

The control apparatus according to any one of (1) to (4), further comprising:
a distance calculation unit that calculates a distance between the moving object and the object.

(6)

The control apparatus according (5), wherein if it is determined that the object is the obstacle, the distance calculation unit calculates a distance between the moving object and the obstacle.

(7)

The control apparatus according (5) or (6), wherein the distance calculation unit calculates a distance between the moving object and the obstacle on the basis of a virtual image of the moving object that is projected on the obstacle.

(8)

The control apparatus according to any one of (1) to (7), further comprising:
an airframe control unit that causes the moving object to avoid the obstacle.

(9)

The control apparatus according to any one of (1) to (8), further comprising:
a light emission control unit that controls an emission pattern of a light-emitting unit that is arranged on the moving object.

(10)

The control apparatus according (9), wherein
if the determination unit detects a first emission pattern while the light-emitting unit is not emitting light, the light emission control unit causes the light-emitting unit to emit light with a second emission pattern that is different from the first emission pattern.

(11)

The control apparatus according (9) or (10), further comprising:
a current location calculation unit that calculates a current location of the moving object, wherein
the light emission control unit causes the light-emitting unit to emit light if the current location is changed and the distance between the moving object and the object is not changed on the basis of a result of calculation of the current location obtained by the current location calculation unit.

(12)

The control apparatus according to any one of (1) to (11), further comprising:
an imaging control unit that control a timing at which the imaging unit captures an image of the object in synchronization with a timing at which a light-emitting unit arranged on the moving object emits light.

(13)

A control method comprising:
acquiring captured data in which an object around a moving object is captured by an imaging unit, the moving object being one of a moving object that is irradiated with spontaneous emission light and a moving object that moves with a predetermined pattern; and
determining that the object is an obstacle if the acquired captured data includes a specific pattern.

(14)

A program that causes a computer to function as:
an acquisition unit that acquires captured data in which an object around a moving object is captured by an imaging unit, the moving object being one of a moving object that is irradiated with spontaneous emission light and a moving object that moves with a predetermined pattern; and
a determination unit that determines that the object is an obstacle if the captured data acquired by the acquisition unit includes a specific pattern.

REFERENCE SIGNS LIST 1, 1A, 1B unmanned flying device
10 light-emitting unit
20 imaging unit
100, 100A, 100B control apparatus
110 storage unit
120 control unit
121 acquisition unit
122 determination unit
123 pattern control unit
124 light emission control unit
125 distance calculation unit
126 airframe control unit
127 current location calculation unit
128 imaging control unit

The invention claimed is:

1. A control apparatus, comprising:
a light emission control unit configured to control an emission pattern of a light-emitting unit that is arranged on a moving object;
an acquisition unit configured to acquire captured data in which an object around the moving object is captured by an imaging unit, wherein
the moving object receives light reflected from the object; and
a determination unit configured to determine that the object is an obstacle in a case where the captured data acquired by the acquisition unit includes a specific pattern, wherein in a case where the determination unit detects a first emission pattern while the light-emitting unit is not emitting light, the light emission control unit is further configured to cause the light-emitting unit to emit light with a second emission pattern that is different from the first emission pattern.

2. The control apparatus according to claim 1, wherein the determination unit is further configured to detect, as the specific pattern, the emission pattern of the reflected light that is a reflection of the emitted light by the object.

3. The control apparatus according to claim 2, wherein the determination unit is further configured to detect the emission pattern of the light-emitting unit that is arranged on the moving object.

4. The control apparatus according to claim 1, wherein the determination unit is further configured to detect, as the specific pattern, a movement pattern of the moving object that is reflected in the object.

5. The control apparatus according to claim 1, further comprising a distance calculation unit configured to calculate a distance between the moving object and the object.

6. The control apparatus according to claim 5, wherein the distance calculation unit is further configured to calculate the distance between the moving object and the obstacle based on a virtual image of the moving object that is projected on the obstacle.

7. The control apparatus according to claim 1, further comprising an airframe control unit configured to cause the moving object to avoid the obstacle.

8. The control apparatus according to claim 1, further comprising a current location calculation unit configured to calculate a current location of the moving object, wherein
based on the calculated current location, the light emission control unit is further configured to cause the light-emitting unit to emit light in a case where the current location is changed and a distance between the moving object and the object is not changed.

9. The control apparatus according to claim 1, further comprising an imaging control unit configured to control a timing at which the imaging unit captures an image of the object in synchronization with a timing at which the light-emitting unit arranged on the moving object emits light.

10. The control apparatus according to claim 1, wherein the moving object comprises at least one of an unmanned flying device, an autonomous mobile robot, or an automatic driving vehicle.

11. A control method, comprising:
controlling, by a light emission control unit, an emission pattern of a light-emitting unit that is arranged on a moving object;
acquiring captured data in which an object around the moving object is captured by an imaging unit, wherein
the moving object receives light reflected from the object; and
determining that the object is an obstacle in a case where the acquired captured data includes a specific pattern, wherein in a case where a first emission pattern is detected while the light-emitting unit is not emitting light, the light emission control unit is configured to cause the light-emitting unit to emit light with a second emission pattern that is different from the first emission pattern.

12. A non-transitory computer-readable medium having stored thereon, computer-executable instructions which, when executed by a processor, cause the processor to execute operations, the operations comprising:

controlling, by a light emission control unit, an emission pattern of a light-emitting unit that is arranged on a moving object;

acquiring captured data in which an object around the moving object is captured by an imaging unit, wherein the moving object receives light reflected from the object; and determining that the object is an obstacle in a case where the captured data includes a specific pattern, wherein in a case where a first emission pattern is detected while the light-emitting unit is not emitting light, the light emission control unit is configured to cause the light-emitting unit to emit light with a second emission pattern that is different from the first emission pattern.

\* \* \* \* \*